(12) United States Patent
Ellersick et al.

(10) Patent No.: US 7,499,489 B1
(45) Date of Patent: Mar. 3, 2009

(54) EQUALIZATION IN CLOCK RECOVERY RECEIVERS

(75) Inventors: William F. Ellersick, Sudbury, MA (US); Louis Nervegna, Somerville, MA (US)

(73) Assignee: Analog Devices, Inc., Norwood, MA (US)

( * ) Notice: Subject to any disclaimer, the term of this patent is extended or adjusted under 35 U.S.C. 154(b) by 811 days.

(21) Appl. No.: 10/944,279

(22) Filed: Sep. 16, 2004

(51) Int. Cl.
*H03K 5/159* (2006.01)
(52) U.S. Cl. .................................................... 375/229
(58) Field of Classification Search ......... 375/229–236, 375/316, 322, 324, 326, 354, 355, 359; 333/17.1, 333/18, 24 R, 28 R; 330/24 R, 28 R, 250, 330/302, 304; 381/98, 103; 327/1, 39, 524, 327/44, 45, 50, 91, 92, 100, 306, 309–311, 327/551–563; 708/100, 200, 300, 322, 323
See application file for complete search history.

(56) References Cited

U.S. PATENT DOCUMENTS

| | | | | |
|---|---|---|---|---|
| 4,423,391 A * | 12/1983 | Ebenhoeh | .................. | 333/28 R |
| 5,046,105 A * | 9/1991 | Bohn | .......................... | 381/98 |
| 5,274,339 A * | 12/1993 | Wideman et al. | ............. | 330/54 |
| 5,533,054 A * | 7/1996 | DeAndrea et al. | ........... | 375/286 |
| 6,047,032 A * | 4/2000 | Zortea et al. | ................. | 375/317 |
| 2002/0126222 A1* | 9/2002 | Choi et al. | ................... | 348/614 |
| 2003/0189997 A1* | 10/2003 | Shanbhag et al. | ........... | 375/348 |
| 2004/0013182 A1* | 1/2004 | Tonietto et al. | ............. | 375/220 |
| 2004/0071219 A1* | 4/2004 | Vorenkamp et al. | ......... | 375/257 |
| 2004/0161070 A1* | 8/2004 | Yin et al. | ..................... | 375/371 |

FOREIGN PATENT DOCUMENTS

WO   WO03/019800 A2 *   3/2003

OTHER PUBLICATIONS

S. Kasturia, J. Winters, *Techniques for High-Speed Implementation of Nonlinear Cancellation*, Jun. 1991 IEEE Journal on Selected Areas in Communications, vol. 9, No. 5, pp. 711-717.
Microprocessor and Microcomputer Standards Subcommittee of the IEEE Computer Society, *IEEE Standard for Scalable Coherent Interface (SCI)*, IEEE Std 1596-1992, Mar. 1992, cover sheet and pp. 226-229.
T. Lee, K. Donnelly, J. Ho, J. Zerbe, M. Johnson, T. Ishikawa, *A 2.5 V CMOS Delay-Locked Loop for an 18 Mbit, 500 Megabyte/s DRAM*, Dec. 1994 IEEE Journal of Solid-State Circuits, vol. 29, No. 12.

(Continued)

*Primary Examiner*—Mohammad H Ghayour
*Assistant Examiner*—Vineeta S Panwalkar
(74) *Attorney, Agent, or Firm*—Marger Johnson & McCollom, PC

(57) ABSTRACT

Equalization techniques in clock recovery receivers may include use of a passive equalizer prior to amplification, combined frequency paths in and active and/or passive equalizer, capacitive degeneration and/or negative feedback with low-pass filtering in an active equalizer, a decision feedback equalizer with multiple decision paths, and programmable tail currents to change switching points. A compensation circuit for a pre/post equalizer may include an oscillator fabricated from replica components to compensate for process variations and a look-up table to provide process variation correction in response to programmed equalizer settings.

11 Claims, 4 Drawing Sheets

OTHER PUBLICATIONS

S. Sidiropoulos, M. Horowitz, *SA 20.2: A Semi-Digital DLL with Unlimited Phase Shift Capability and 0.08-400MHz Operating Range*, 1997 IEEE International Solid-State Circuits Conference, pp. 332-333 and 481.

S. Sidiropoulos, M. Horowitz, *A Semidigital Dual Delay-Locked Loop*, Nov. 1997 IEEE Journal of Solid-State Circuits, vol. 32, No. 11, pp. 1683-1692.

S. Sidiropoulos, *High Performance Inter-Chip Signalling, Technical Report No. CSL-TR-98-760*, Apr. 1998, Computer Systems Laboratory Departments of Electrical Engineering and Computer Science, cover sheet, pp. ii, iii, iv, iii, iv, v, vi, vii, viii, ix, x, pp. 1-127.

R. Prentice, S. Rogers, B. Payne, *XAUI: Curing Internal Speed Blockages*, Jan. 2002, EE Times, pp. 1-4 printed from eetimes.com website and Figure 1 and Figures 2 attached to end of article.

*Designing Multi-Gigabit Serial Backplanes with High Speed SERDES Solutions Marketing White Paper*, Nov. 2002 PMC-Sierra Article, pp. 1-15.

\* cited by examiner

EQUALIZATION IN CLOCK RECOVERY RECEIVERS

BACKGROUND

FIG. 1 illustrates a receiver for a data transmission system utilizing point-to-point serial interconnects. The input to the receiver 10 is a stream of serial data that has clock information embedded in the signal. A clock/data recovery (CDR) unit 12 recovers the clock from the stream of serial data to generate a receive clock signal RCLK which is used by the receiver 10 to sample and retime the data from the serial stream. The data is then typically converted to a parallel format and passed along to other apparatus such as a crosspoint switch where data from multiple receivers is re-routed to multiple transmitters.

The receiver shown in FIG. 1 may be used in high-speed data transmission systems where the integrity of the incoming signal is degraded by the transmission path between the transmitter and receiver. For example, the signal may be routed from a transmitter on an integrated circuit (IC) mounted on a first printed circuit board (PC board), over traces on the first board, through contacts on a connector that couple the first board to a backplane, across the backplane, through another connector that couples the back plane to a second board, over an additional set of traces on the second board, and finally to the receiver on a second IC. This transmission path results in a high degree of signal loss, with high-frequency components of the signal being more severely attenuated than the low-frequency components. Cross-talk and noise may also be introduced by the backplane system.

To maintain a reliable flow of high-speed data through a noisy and lossy transmission path, the receiver of FIG. 1 may include an equalizer that compensates for signal loss. Most commonly, the equalizer restores a signal's high frequency components that are attenuated by the transmission path. An equalizer may have programmable equalizer settings to allow a system designer to match the amount of equalization to the measured or calculated amount of attenuation caused by the transmission path.

DETAILED DESCRIPTION

This patent disclosure encompasses numerous inventions relating to equalization in data transmission systems. These inventive principles have independent utility and are independently patentable. In some cases, additional benefits are realized when some of the principles are utilized in various combinations with one another, thus giving rise to yet more patentable inventions. These principles can be realized in countless different embodiments. Only the preferred embodiments are described below. Although some specific details are shown for purposes of illustrating the preferred embodiments, other equally effective arrangements can be devised in accordance with the inventive principles of this patent disclosure. Thus, the inventive principles are not limited to the specific details disclosed herein.

Passive Equalization

Figure 1:
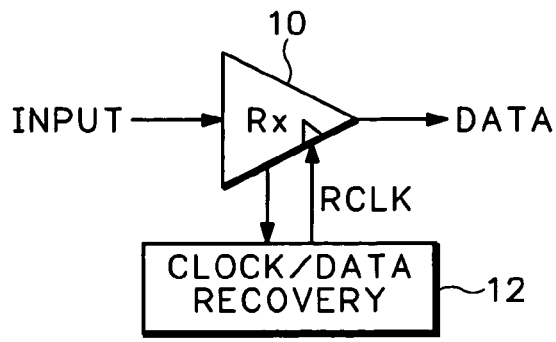
FIG. 1 illustrates a prior art receiver that utilizes a clock recovered from a stream of serial data.
Figure 2:
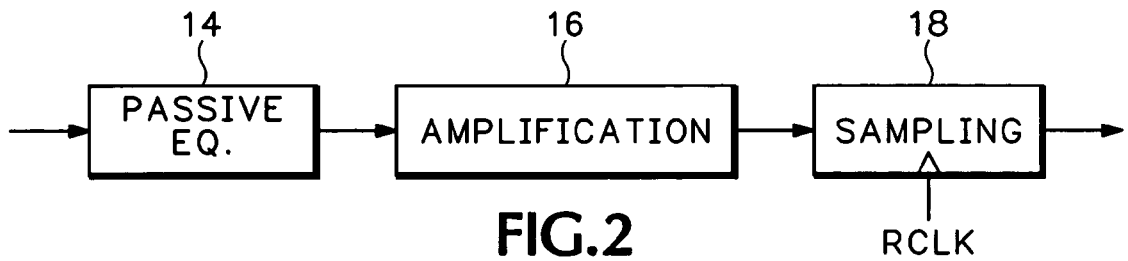
FIG. 2 illustrates an embodiment of a receiver according to some of the inventive principles of this patent disclosure.

Some of the inventive principles of this patent disclosure relate to passive equalizers. FIG. 2 illustrates an embodiment of a receiver having passive equalization according to the inventive principles of this patent disclosure. The receiver of FIG. 2 includes a passive linear equalizer 14, some form of amplification 16, and a sampling circuit 18. The input signal to the passive equalizer includes a stream of serial data having embedded clock information. The sampling circuit samples data in the signal in response a receive clock signal RCLK recovered from the input signal.

A challenge in the design of linear equalizers is that amplifiers usually have limited input signal range. If a signal beyond the input range is applied to an amplifier, it may introduce a nonlinearity resulting in data errors. The circuit of FIG. 2 may overcome this problem. The passive equalizer 14 may be designed to attenuate low frequency signal components before amplification, thereby allowing a large input signal range to be linearly equalized.

One technique for implementing the passive equalization would be to include separate filters (e.g., high-pass and all-pass) and then sum the outputs of the filters. Another technique according to the inventive principles of this patent disclosure involves the use of a passive equalizer with combined high and low frequency paths as will be described below. In a practical realization, the amplification and sampling functions illustrated in FIG. 2 may also be realized in myriad ways. For example, they may be combined in a single component, spread out individually over multiple components, or even spread out over multiple components with each component performing a portion of both functions.

Figure 3:
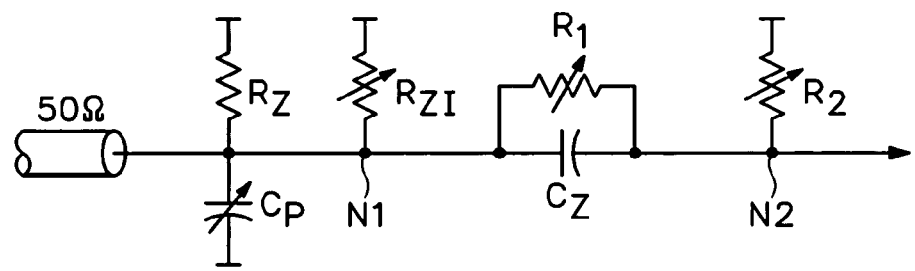
FIG. 3 illustrates an embodiment of a passive equalizer having combined high and low frequency paths according to the inventive principles of this patent disclosure.

FIG. 3 illustrates an embodiment of a passive equalizer having combined high and low frequency paths according to the inventive principles of this patent disclosure. The circuit of FIG. 3 includes an input node N1 and an output node N2. Capacitor $C_Z$ and resistor $R_1$ are both connected between N1 and N2. Resistors $R_Z$ and $R_{ZI}$ are connected between N1 and a positive power supply ($V_P$), while a capacitor $C_P$ is connected between N1 and a power supply ground (GND). Another resistor $R_2$ is connected between N2 and $V_P$.

The input signal, which in this example is received on a transmission line having a characteristic impedance of 50Ω, is applied to N1. Other characteristic impedances may be used. The output is taken at N2. If $R_1$ and $R_2$ are much larger than half the characteristic impedance (e.g., 25Ω), the rest of the circuit may be analyzed as if it is driven by a low impedance voltage source. Thus, at low frequencies, the signal flows primarily through R1, and the loss is approximately $R_2/(R_1+R_2)$, while at high frequencies, the signal passes through $C_Z$ with a small loss $C_Z/(C_Z+C_{LOAD})$ where $C_{LOAD}$ is the input capacitance of the next stage, which in this embodiment is the amplifier 20.

In this embodiment, resistors $R_{ZI}$, $R_1$ and $R_2$, and capacitor $C_P$ are shown as adjustable components to facilitate adjustment of the equalizer settings, but fixed components may be used as well. Resistor $R_Z$ may be set to terminate to 50 Ohms to match the transmission line impedance, and $R_{ZI}$ may be adjusted to maintain a constant input impedance that otherwise would vary if resistor $R_2$ were varied. Capacitor $C_P$ forms a pole against the input impedance (along with any parasitic capacitances such as those that may result from ESD protection circuits, bonding pads, etc.), and may be adjusted to limit the bandwidth, thereby reducing noise and crosstalk. Resistors $R_1$ and $R_2$ may be adjusted to match the transmission line and connector losses. Though not shown in FIG. 3, a current source, preferably adjustable, may need to be connected between N2 and a power supply to provide proper signal biasing for any stage that may follow the circuit of FIG. 3.

Active Equalization

Some additional inventive principles of this patent disclosure relate to active equalizers. These additional principles have independent utility, but some may also be used to implement the amplification function of the embodiment of FIG. 2.

Figure 4:
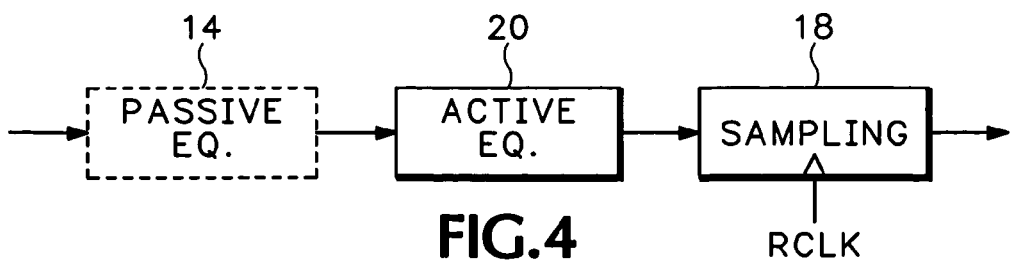
FIG. 4 illustrates an embodiment of a receiver having active equalization according to the inventive principles of this patent disclosure.

FIG. 4 illustrates an embodiment of a receiver having active equalization according to the inventive principles of this patent disclosure. The embodiment of FIG. 4 includes an active equalizer 20 and a sampling circuit 18. A passive equalizer 14 may optionally precede the active equalizer, and is therefore shown in dotted line form. The active equalizer 20 may include any or all of the following inventive features in various combinations: combined high and low frequency paths, low frequency degeneration, low-pass filtering in a negative feedback path, and programmable tail currents and/or switching points. Combined high and low frequency paths may eliminate the need for summing the outputs from separate frequency paths. Low frequency degeneration, for example using a capacitively degenerated differential pair of transistors, may allow a large input signal range to be linearly equalized. Low-pass filtering in a negative feedback loop may produce a high-pass filter, which, by reducing gain at high frequency, may avoid the need for creating extra gain at high frequencies. Programmable tail currents and/or switching points may be used to correct for input offset voltages and/or to implement a novel form of decision feedback equalization.

Figure 5:
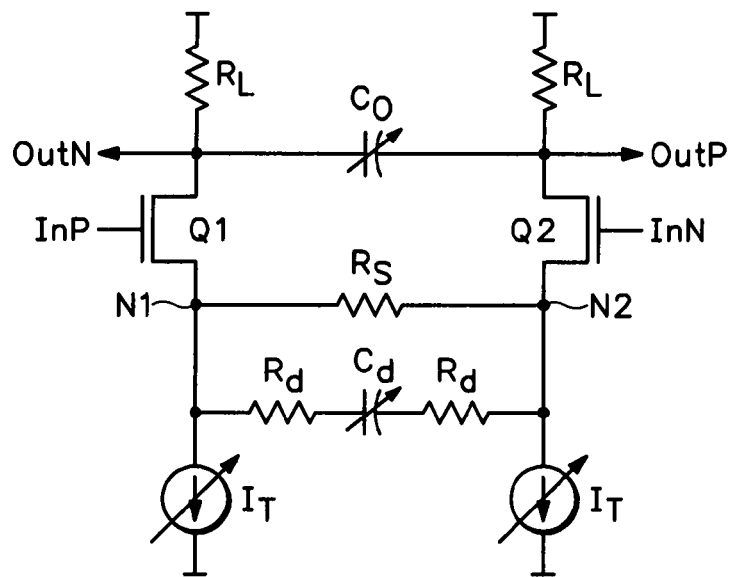
FIG. 5 illustrates another embodiment of an active equalizer according to the inventive principles of this patent disclosure.

FIG. 5 illustrates an embodiment of an active equalizer having combined high and low frequency paths, capacitive degeneration, and low-pass filtering in a negative feedback loop according to the inventive principles of this patent disclosure. The circuit of FIG. 5 includes a pair of differential transistors Q1 and Q2, which receive the differential input signals InP and InN at their gates, respectively. The channel of Q1 is connected between node N1 and output terminal OutN, while the channel of Q2 is connected between node N2 and output terminal OutP. Tail currents $I_T$ bias Q1 and Q2 at nodes N1 and N2. Load resistors $R_L$ are connected between the output terminals and a positive power supply. A resistor $R_S$ is connected between N1 and N2. A series combination of $R_d$, $C_d$ and $R_d$ is also connected between N1 and N2. A capacitor $C_O$ is connected between the output terminals.

At low frequencies, the differential pair Q1,Q2 is degenerated mainly by resistor $R_S$ resulting in a low frequency gain of $\sim R_L/R_S$, thereby improving linearity over the input signal range. At high frequencies, $C_d$ reduces the degeneration to provide a high-frequency gain of $\sim R_L/(2R_d\|R_S)$. Capacitor $C_O$ adds a pole to limit bandwidth.

In this embodiment, capacitors $C_O$ and $C_d$ are shown as adjustable components to facilitate adjustment of the equalizer settings, but fixed components may be used as well. The circuit of FIG. 5 has fully differential inputs and outputs, but single-ended versions are also possible.

If the tail currents IT are implemented as adjustable current sources, they may be adjusted to change the switching point (i.e., the point at which the differential output is zero) of the active equalizer. This shift in switching point may be used to inject voltage errors, correct the input offset voltage of the receiver, or implement a predictive pipeline decision feedback equalizer (DFE) as described below.

Decision Feedback Equalization

Figure 6:
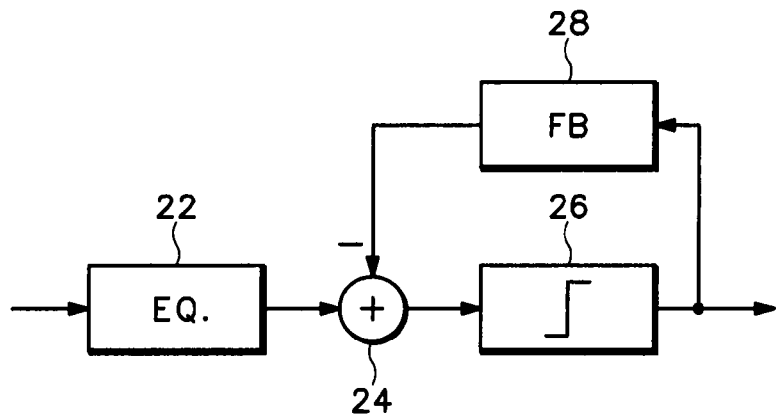
FIG. 6 illustrates a prior art decision feedback equalizer.

FIG. 6 illustrates a conventional decision feedback equalizer (DFE) having a linear equalizer 22 followed by an adder 24 and a decision element 26 (sometimes referred to as a slicer). The output from the decision element is fed back to the adder through a feedback element 28. The DFE subtracts a fraction of the previous decision from the next analog input, after sampling and amplification. Since data decisions are amplified to full logic levels, they contain no noise, and thus DFE does not degrade signal-to-noise ratio as a linear equalizer may. A DFE may be difficult to implement in high-speed receivers, however, because data decisions need to be sampled, amplified, and added back to the analog input in a single bit time.

Figure 7:
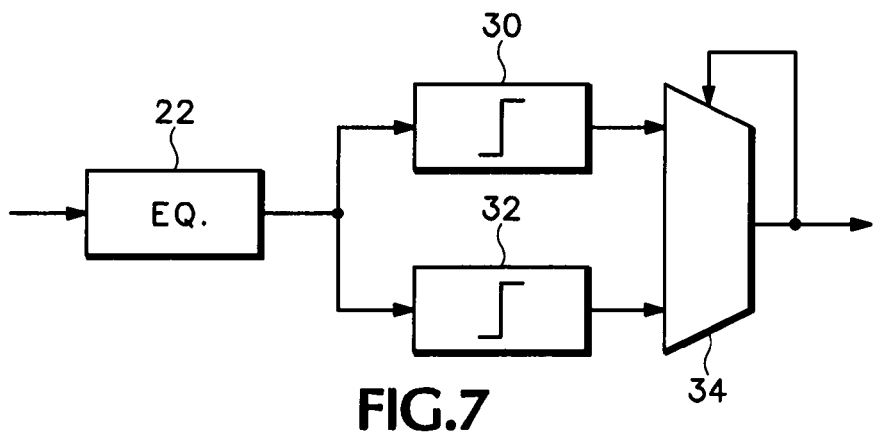
FIG. 7 illustrates an embodiment of a decision feedback equalizer according to the inventive principles of this patent disclosure.

FIG. 7 illustrates an embodiment of a decision feedback equalizer according to the inventive principles of this patent disclosure. The embodiment of FIG. 7 includes two decision paths 30 and 32 having different switching points. A multiplexer 34 is connected to the decision paths and provides the final output by selecting an output from one of the decision paths in response to a previous output from multiplexer. In essence, this may break the critical timing loop of the conventional DFE shown in FIG. 6 and result in a pipelined DFE that may be able to operate at higher speeds.

A linear equalizer 22 is shown preceding the two decision paths, but is not critical to a DFE according to the inventive principles of this patent disclosure. Likewise, the inventive principles are not limited to a DFE having two decision paths.

As mentioned above and reiterated here, the various inventive principles of this patent disclosure have independent utility. However, some of these principles may be combined in a synergistic manner to create a robust, high-speed receiver capable of operating at bit transfer rates well into the multiple-Gbit/s range with low power consumption and low bit error rate.

Figure 8:
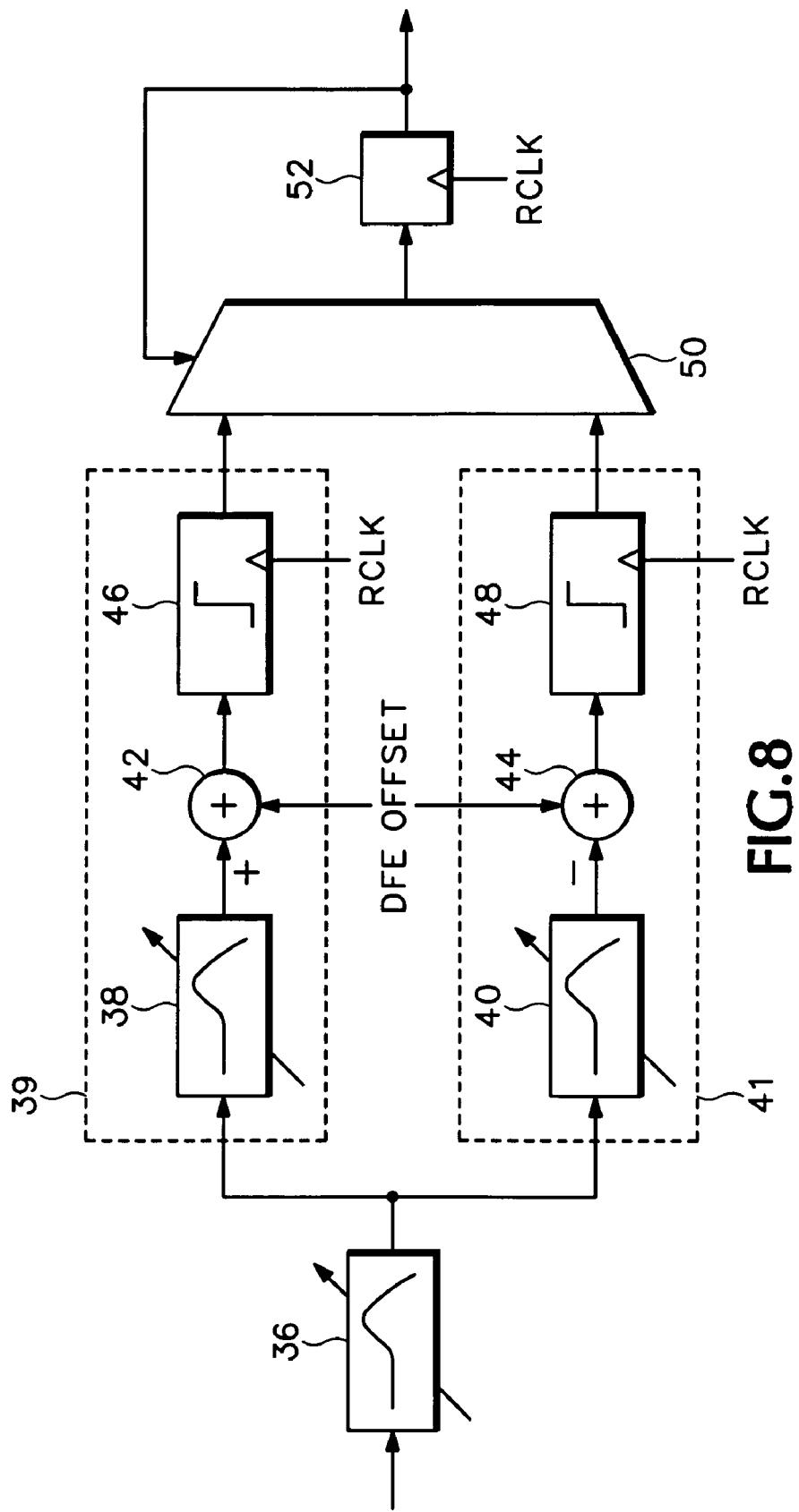
FIG. 8 illustrates another embodiment of a receiver according to the inventive principles of this patent disclosure.

FIG. 8 illustrates such a system combining some of the various inventive principles described above. The embodiment of FIG. 8 begins with a passive equalizer 36 shown here graphically having high frequency peaking and adjustable settings. The output from the passive equalizer drives two decision paths 39 and 41 having different switching points. Decision path 39 includes an active equalizer 38, also shown graphically as having high frequency peaking and adjustable settings. An adder 42 adds an offset to the output from the active equalizer which then drives decision element 46.

Decision path 41 is essentially the same as 39 but the switching point is adjusted in the opposite direction by the addition of an equal but opposite offset to the output of active equalizer 40. This is accomplished by subtracting rather than adding the offset.

The outputs from the decision paths are fed into multiplexer 50, which selects the output from one of the decision paths. A latch 52 introduces a one-bit delay for controlling the multiplexer so that the appropriate decision path is selected based on the previous data decision.

Any sampling and/or retiming functions within the decision elements, multiplexer, and/or latch may be clocked by the receive clock signal RCLK recovered from the input signal.

Although the inventive principles of this patent disclosure are not limited to any particular implementation details, experimentation with lossy transmission line and connector models in 3 Gbit/s systems has shown that continuous time equalization with 2 zeros and 4 poles matches line and connector losses well, with additional zeros not offering significant improvement. Therefore, the circuits shown in FIGS. 3 and 5 are ideal for implementing the passive equalizer 36 and active equalizer 38, respectively, because each of these circuits contributes one zero and two poles to the overall equalization. Thus, the circuits shown in FIGS. 3 and 5 may be combined to provide an optimum equalization solution.

A further benefit of implementing the active equalizer with the circuit of FIG. 5 is that the adders may be integrated directly into the active equalizers. That is, the tail currents IT in equalizer 38 may be set to values that offset the switching point in one direction, while the tail currents in equalizer 40 may be set to values that offset the switching point in the opposite direction. Thus the active equalizers are tightly integrated into the decision paths in a manner that provides the different switching points needed for a pipelined DFE.

Some additional possible refinements are as follows. To increase the bit rate for any given fabrication process, half-rate clocking can be used with parallel odd and even data paths. In the embodiment of FIG. 8, this may result in parallel odd and even data paths in the decision elements, multiplexer, and latch. If a clock/data recovery (CDR) scheme utilizing timing samples is employed, the timing sample outputs as well as data outputs may also be routed through the multiplexer.

Correction Circuitry

Figure 9:
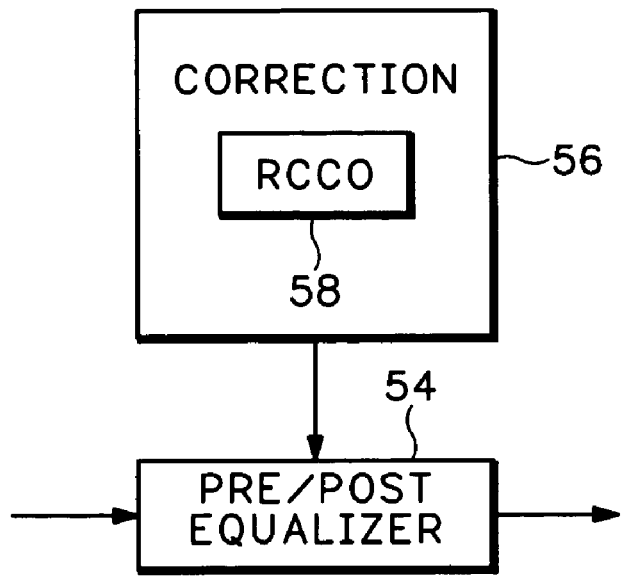
FIG. 9 illustrates an embodiment of a correction scheme according to the inventive principles of this patent disclosure.

FIG. 9 illustrates an embodiment of a correction scheme according to the inventive principles of this patent disclosure. A pre/post equalizer having adjustable settings 54 may be associated with a receiver or a transmitter. A correction circuit 56 includes a free-running RC-controlled oscillator (RCCO) 58 fabricated from components that replicate the components in the equalizer, e.g., the same unit resistors and capacitors used in the equalizer. The RCCO generates a clock signal having a frequency that varies across process variations. By measuring the frequency of the RCCO, the correction circuit may provide corrected settings to the equalizer to compensate for process variations in the components in the equalizer.

Figure 10:
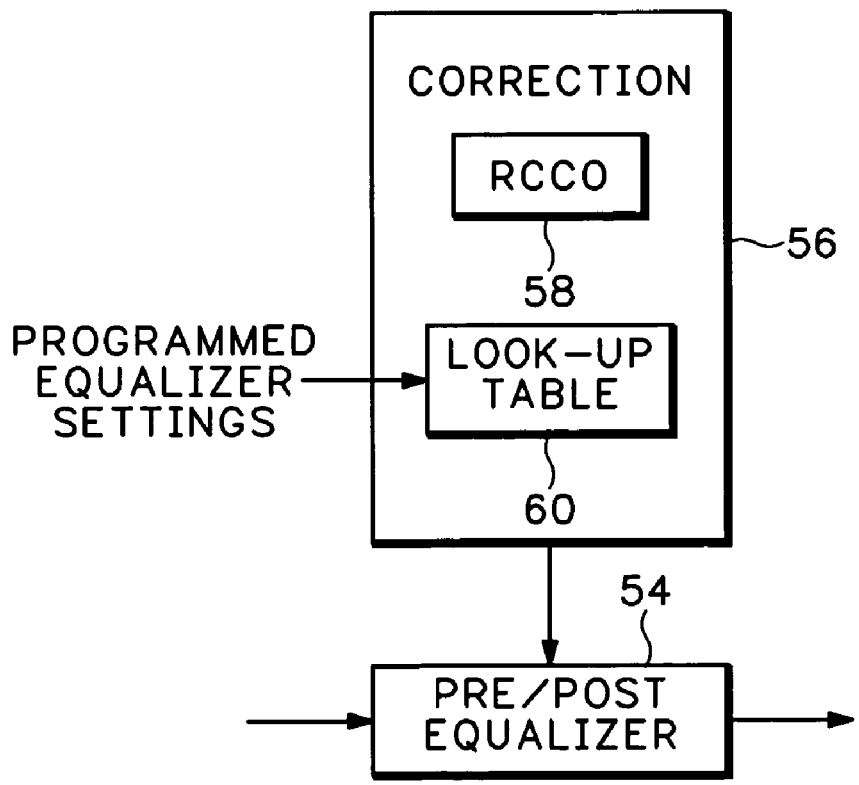
FIG. 10 illustrates another embodiment of a correction scheme according to the inventive principles of this patent disclosure.

FIG. 10 illustrates an embodiment of a correction scheme including some additional features according to the inventive principles of this patent disclosure. In addition to an RCCO fabricated with replica components, the correction circuit 56 of FIG. 10 includes a lookup table 60 that generates corrected equalizer settings based on the RCCO frequency as well as user programmed equalizer settings. Thus, a system designer may provide programmed equalizer settings to the correction circuit based on connector types, transmission line parameters, etc. The correction circuit may then automatically provide corrected equalizer settings to the equalizer to compensate for process variations.

The inventive principles of this patent disclosure have been described above with reference to some specific example embodiments, but these embodiments can be modified in arrangement and detail without departing from the inventive concepts. For example, some transistors have been illustrated with specific CMOS implementations, but other types of devices may be used as well. Likewise, embodiments of some circuits have been described with power supplies having positive voltage with respect to a power supply ground, but the inventive principles of this patent disclosure are not limited to circuits have any particular power supply polarity or ground potential. Thus, such changes and modifications are considered to fall within the scope of the following claims.

The invention claimed is:

1. A receiver comprising:
   a passive equalizer to receive a signal;
   a first decision path coupled to the passive equalizer to sample data in the signal responsive to a clock recovered from the signal;
   a second decision path to sample data in the signal responsive to the clock recovered from the signal; and
   a multiplexer coupled to the decision paths to select an output from one of the decision paths;
   where the first and second decision paths have different switching points; and
   where:
   the second decision path is coupled to the passive equalizer;
   each decision path comprises an active equalizer and a decision element arranged to sample data in the signal responsive to the clock recovered from the signal; and
   the multiplexer is arranged to select the output from one of the decision paths responsive to a previous output from one of the decision paths.

2. The receiver of claim 1 where the passive equalizer has combined frequency paths.

3. The receiver of claim 2 where the frequency paths are high and low frequency paths.

4. The receiver of claim 2 where the passive equalizer includes:
   a capacitor coupled between an input node and an output node; and
   a resistor coupled between the input node and the output node.

5. The receiver of claim 2 where the passive equalizer further includes a second resistor coupled between the output node and a power supply.

6. The receiver of claim 1 where the equalizers have capacitive degeneration.

7. The receiver of claim 1 where:
   the passive equalizer comprises combined high and low frequency paths to provide peaking at higher frequencies;
   the active equalizers include capacitive degeneration to provide peaking at higher frequencies; and
   the active equalizers provide the different switching points through programmable tail currents.

8. The receiver of claim 1 where the decision paths and multiplexer include parallel odd and even data paths that are clocked by half-rate clocking.

9. The receiver of claim 8 where timing sample outputs are routed through the multiplexer.

10. A receiver comprising:
    a passive equalizer to receive a signal;
    a first decision path coupled to the passive equalizer to sample data in the signal responsive to a clock recovered from the signal;

a second decision path to sample data in the signal responsive to the clock recovered from the signal; and a multiplexer coupled to the decision paths to select an output from one of the decision paths;

where the first and second decision paths have different switching points;

where each decision path comprises an active equalizer; and where the active equalizers provide the different switching points through programmable tail currents.

11. The receiver of claim 10 where:

the passive equalizer has a zero and two poles; and the active equalizer in the first decision path has a zero and two poles.

* * * * *